(12) United States Patent
Pusl

(10) Patent No.: US 8,129,870 B1
(45) Date of Patent: Mar. 6, 2012

(54) ASYMMETRIC FOLDED SPRING FLEXURE SUSPENSION SYSTEM FOR RECIPROCATING DEVICES

(76) Inventor: Kenneth E. Pusl, Valencia, CA (US)

( * ) Notice: Subject to any disclaimer, the term of this patent is extended or adjusted under 35 U.S.C. 154(b) by 146 days.

(21) Appl. No.: 12/462,353

(22) Filed: Aug. 4, 2009

(51) Int. Cl.
*H02K 33/00* (2006.01)
*H02K 35/00* (2006.01)

(52) U.S. Cl. .............. 310/15; 310/14; 310/36; 335/220; 335/222; 335/274

(58) Field of Classification Search .................. 310/15, 310/14, 36, 38, 25; 416/500; 335/222, 270, 335/271, 220, 274; 188/378; 267/140.14, 267/140.15; *H02K 33/00, 35/00*
See application file for complete search history.

(56) References Cited

U.S. PATENT DOCUMENTS 4,106,995 A * 8/1978 Petersen et al. .................. 435/29

(Continued)

*Primary Examiner* — Quyen Leung
*Assistant Examiner* — Thomas Truong
(74) *Attorney, Agent, or Firm* — J. E. McTaggart

(57) ABSTRACT

An asymmetric folded spring flexure suspension system can enable an ultra-compact linear reciprocative device wherein a reciprocative mass suspended from a base by a single folded flexure assembly extends in a single generally radial direction perpendicular to the intended travel path. The folded flexure assembly can be configured as three side-by-side stacks of flexure strips of spring material, tied together at a "yoke-idler" end; at the opposite "working" end, a central stack of nominal width is tied to the mass, and, flanking the central stack, a pair of half-width stacks are tied to opposite sides of the base. In an embodiment for active vibration control, a cylindrical enclosure, of magnetically-permeable material and attached to the working end of the flexure assembly, contains a driver system including an internally-mounted pair of permanent magnets that provide a magnetic flux gap and also constitute the main portion of the mass. Also within the enclosure, but supported from the base by rods extending up through clearance holes in the bottom cover/pole plate of the enclosure, is a single bobbin-mounted coil which, being located in the magnetic flux gap, drives reciprocation of the armature/mass enclosure in response to alternating electrical current applied to the coil.

16 Claims, 3 Drawing Sheets

U.S. PATENT DOCUMENTS

| | | | |
|---|---|---|---|
| 4,185,311 A * | 1/1980 | Gyi et al. | 360/98.03 |
| 4,236,842 A * | 12/1980 | Dick et al. | 400/144.2 |
| 5,231,336 A | 7/1993 | van Namen | |
| 5,602,432 A * | 2/1997 | Mizutani | 310/15 |
| 5,735,169 A * | 4/1998 | Niimi et al. | 74/7 A |
| 5,896,076 A | 4/1999 | van Namen | |
| 6,764,520 B2 * | 7/2004 | Deffenbaugh et al. | 623/24 |
| 7,288,861 B1 | 10/2007 | Willard et al. | |
| 7,550,880 B1 | 6/2009 | Pusl | |
| 7,686,246 B2 * | 3/2010 | Badre-Alam et al. | 244/17.13 |

* cited by examiner

ASYMMETRIC FOLDED SPRING FLEXURE SUSPENSION SYSTEM FOR RECIPROCATING DEVICES

FIELD OF THE INVENTION

The present invention relates to the field of linearly-reciprocating mechanisms including actuators for passive vibration control and actuators for active vibration control, directed particularly to efficient folded flexure systems for compliantly suspending a mass portion from a base portion in a manner that constrains the travel of the mass portion to a linear path and a defined stroke length. Unusually small overall size is accomplished in an active version utilizing a novel ultra-compact electromagnetic driver system.

BACKGROUND OF THE INVENTION

In a reciprocative mechanical device such as a piston pump, fuel pump, solenoid and other actuator, linear motors and the like, typically there is a mass portion, that requires some form of suspension system to allow reciprocative motion relative to a base portion. Generally the suspension serves at least one of two primary functions; in the present invention the suspension system serves both of the following primary functions:

(1) in the absence of a sliding bearing system, to constrain the reciprocative motion of the mass portion to a straight line, with no canting, over a designated stroke length, and (2) in the absence of external driving or restoring force, to act as a restoring force to return the mass portion to a desired quiescent location typically midway in the stroke length.

In the present field of endeavor directed to vibration control, both passive (inertial) and active (utilizing reciprocative drivers, typically electromagnetic), the evolution that has taken place in the ongoing search for satisfactory suspensions has included many different approaches including sliding bearings, flexure discs, flat springs, coil springs of both metallic and non-metallic resilient materials, each of which have been found to have disadvantages and shortcomings in this field of endeavor.

Flat spring flexures in the form of radial strips or circular diaphragms can offer simplicity, high ruggedness and reliability; however in simple "non-folded" deployment simply attached between a mass portion and a base portion, they cannot provide linear travel of one portion relative to the other unless made of elastic material, due to the geometric relationship of a right-angled triangle having the undeflected flexure length/radius as the X-axis base, and a half-stroke displacement as the Y-axis height: at stroke-end, the flexure has to actually "stretch" to at least the length of the hypotenuse.

DISCUSSION OF KNOWN ART

U.S. Pat. No. 7,550,880 B1 by the present inventor, disclosing FOLDED SPRING FLEXURE SUSPENSION FOR LINEAR ACTUATOR, is incorporated herein by reference as providing detailed background information and References Cited in the present field of endeavor, and teaching the principles of folded flexure strips as deployed in a balanced array of at least a symmetrical pair of folded flexure members each having two virtual half-flexure members attached together at a yoke/yoke-idler end to form a virtual full flexure member attached between a reciprocative mass and a main mounting base, relying on the symmetry of a plurality of flexure members preferably stacked in a radial array to balance and eliminate forces perpendicular to the axis of stroke travel that would tend to divert the mass from the intended straight line path or cause tipping or canting, i.e. unwanted rotational deviation of the reciprocative mass portion from its nominal orientation relative to the base portion.

OBJECTS OF THE INVENTION

It is a primary object of the present invention to provide a linear reciprocative actuator that that utilizes a stacked folded flexure system of novel simplified asymmetric configuration for suspending a mass portion from a base portion in a manner that constrains travel of the mass portion to a linear path and that avoids tipping or canting of the mass portion.

It is a further object that in an embodiment for active vibration utilizing an electromagnetic driver, to utilize the mass of the permanent magnet system as a major portion of the armature/mass portion.

It is a further object that the electromagnetic driver be contained in an enclosure of magnetically-permeable material and that the enclosure and its attached internal contents be made to constitute the armature/mass portion.

It is a still further object that the actuator for active vibration control including its stator/base, its asymmetric folded flexure system and its enclosed driver forming the armature/mass, to be overall cost-effective, easily assembled, highly reliable and in particular, to be ultra-compact in size.

SUMMARY OF THE INVENTION

The foregoing objects have been met in the linear actuator of the present invention of a by suspending a mass portion consisting mainly of a pair of permanent magnets in an enclosure of magnetically-permeable material, the mass portion being suspended by a single folded flexure assembly attached to a side of the mass portion and extending offset therefrom in a single generally radial direction perpendicular to the travel path. The folded flexure assembly is configured as three side-by-side legs of stacked flexure strips of selected spring material, clamped rigidly together as a solid unit at a yoke-idler end, thus forming the stack as a letter E shape with a trio of legs extending to the opposite "working" end, where the central leg stack of nominal width is rigidly attached to the mass portion, and, flanking the central stack, the flexures in these stacks are each made half the width of the central stack and are attached rigidly to the base portion. In an ultra-compact embodiment for active vibration control, a cylindrical magnetically-permeable enclosure, containing an internally-attached pair of permanent magnets, acts as the armature/mass portion, being attached to the working node of the flexure assembly. Also within the enclosure, supported from the stator/base portion by a set of rods extending up from the base/stator and traversing clearance holes configured in the bottom cover plate of the enclosure, a single coil traversed by a magnetically-charged flux gap, drives reciprocation of the armature/mass portion in response to alternating electrical current applied to the coil.

DETAILED DESCRIPTION

Figure 1:
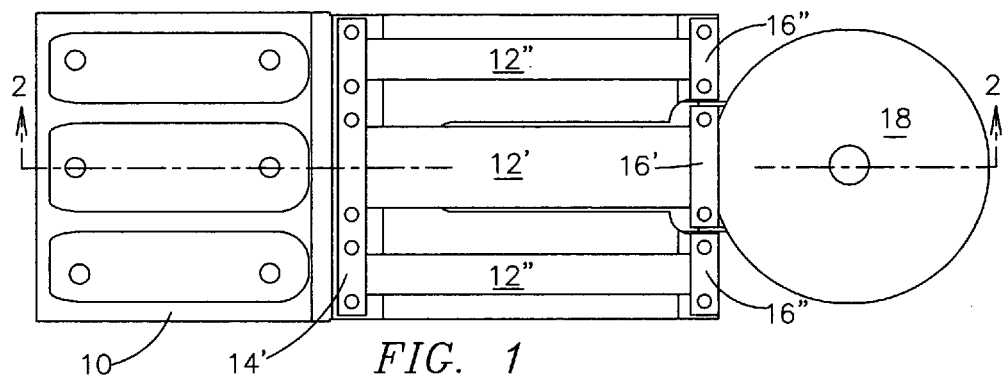
FIG. 1 is a top view of a reciprocative mass actuator in accordance with the present invention.

FIG. 1, a top view of a reciprocating actuator in accordance with the present invention, shows the base 10 on which is mounted a flexure assembly formed as a stack of generally flat flexure elements each having a full-width central leg 12', flanked by two half-width side legs 12".

At the "yoke-idler" end, to the left as shown, all three legs in each flexure element are typically made integral and the stack of flexure elements is bolt-clamped under keeper bar 14'.

At the opposite "working" end, to the right as shown, the three legs are kept separated from each other. The stack of flexure elements in the central leg is bolt-clamped under central keeper bar 16' at the working end, which is attached rigidly in a cantilever manner to the mass portion 18 represented by the circle shown, while the working end of each side leg is bolt-clamped under a keeper bar 16" and rigidly attached to base 10 on a support pads that are not visible in this view.

In deployment for suppressing unwanted vibration, the base 10 is solidly attached onto a host object at a strategically selected location associated with the unwanted vibration. In active vibration control, the mass, being compliantly suspended to provide a desired physical resonance, is driven electro-magnetically to reciprocate at optimal frequency and amplitude to suppress the unwanted vibration.

In an embodiment to operate as a reactive device for passive vibration control, the mass portion 18 is simply a solid body made of any chosen material or shape to have the required weight to serve as the reciprocating mass. The reactive device receives no externally-applied drive energy; instead, the mass becomes reciprocated by energy received from the host object through the solid attachment of base 10, which must be located optimally on the host object such that when the resonant frequency is tuned optimally by the combination of mass and flexure suspension compliance, the unwanted vibration becomes loaded and suppressed in a complex reactive damping manner that typically involves also taking into account the role of harmonic frequencies.

In an embodiment for active vibration control, the mass portion, known as an armature/mass portion, consists of a full cylindrical enclosure 18 of magnetically-permeable metal containing an electromagnetic driver system including a base-supported coil, internally-attached permanent magnets and a central magnetic pole-piece disk forming a magnetically-charged air gap traversing the coil.

Figure 2:
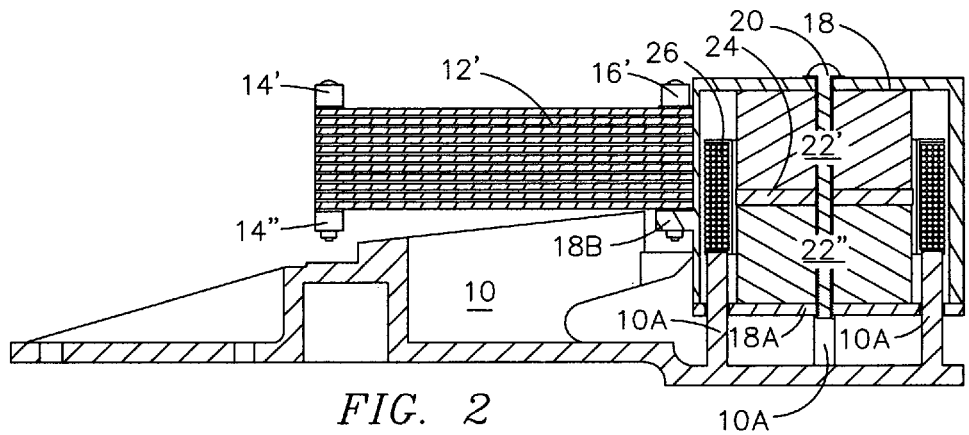
FIG. 2 is a cross-section take through axis 2-2 of FIG. 1 with the reciprocative mass and stacked flexure assembly in its neutral quiescent mid-stroke location.

FIG. 2, a cross-section take through axis 2-2 of FIG. 1, depicts an active vibration control embodiment of the invention with the mass portion implemented as an armature/mass portion configured as a full magnetically-permeable enclosure 18 with a removable bottom plate 18A held in place by a central bolt 20 which also traverses and secures a pair of identical permanent magnets 22' and 22", arranged with their like magnetic poles, e.g. S, interfacing opposite sides of a circular pole-piece 24, and with the opposite poles, e.g. N, of upper magnet 22' interfacing the top plate of enclosure 18, and N of lower magnet 22" interfacing bottom plate 18A of enclosure 18. The enclosure 18, its bottom plate 18A and pole-piece 24, being made from magnetically-permeable material that serves as a yoke or conducting magnetic flux, creates a magnetically-charged gap between the perimeter of pole-piece 24 and the surrounding region of enclosure 18.

Immediately inside the perimeter wall of enclosure 18, a coil 26 of copper wire is wound on an insulating bobbin that is attached to the base 10 by four posts 10A that traverse four corresponding holes in bottom plate 18A. The four holes are dimensioned to provide sufficient clearance from posts 10A for enclosure 18 to reciprocate in a vertical direction.

The coil 26, being traversed centrally by concentrated magnetic flux at the gap, is thus enabled to deflect enclosure 18, i.e. the armature/mass, in a vertical direction in response to application of electric current in the coil 26, operating according to the "right hand rule" of electro-magnetics in the mode of a magnetic loudspeaker voice coil.

The stack of flexures, typified by central leg 12,' is seen to be solidly bolt-clamped together at the left hand yoke-idler end between a sturdy full-width top yoke-idler keeper bar 14' and bottom yoke-idler keeper bar 14", and similarly bolt-clamped at the right hand working end with central leg 12' clamped between the central the upper keeper bar 16' and a cantilevered support ledge 18B molded or otherwise integrally formed as part of enclosure 18. Similarly, but not visible in this view, each of the side leg stacks is bolt-clamped at the right hand working end between an upper keeper bar (16", FIG. 1) and a support pad (10B, FIG. 3) formed on base 10.

Figures 3, 4:
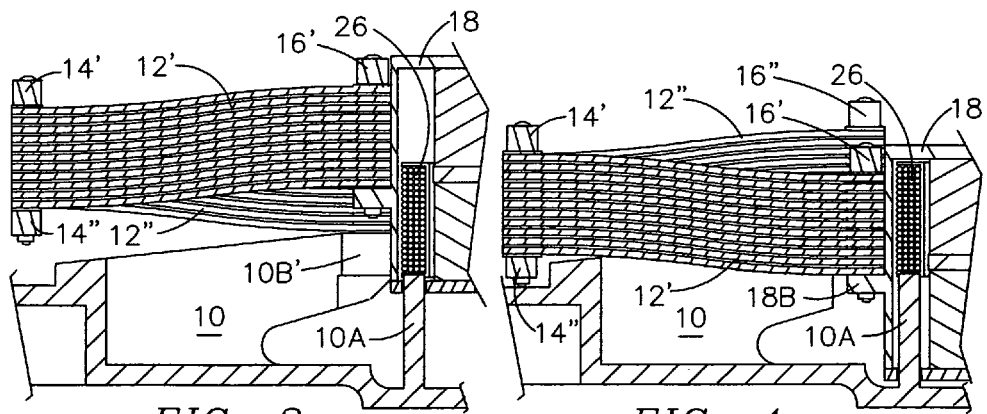
FIG. 3 depicts a cutaway portion of the subject matter of FIG. 2 showing the flexure assembly maximally deflected to the upper end of the stroke range.
FIG. 4 depicts the cutaway portion of FIG. 2 showing the flexure assembly maximally deflected to the lower end of the stroke range.

FIG. 3, replicating the main items of FIG. 2 with partial cutaway, shows the flexure assembly with the center leg 12' deflected upwardly by current of a first polarity in coil 26, driving enclosure 18 to the upper end limit of the stroke range.

FIG. 4, also replicating the items of FIG. 2 with partial cutaway, shows the center leg 12 maximally deflected downwardly by current of a second and opposite polarity in coil 26, driving enclosure 18 to the lower end limit of the stroke range, exposing keeper bar 16" in this view along with an upper portion of the flexures in the corresponding side leg 12".

Under deflection, it is intended that the flexures bend to form the S shape as shown in FIGS. 2 and 4. This S shape is essential for the enclosure 18 to always move in a straight vertical line and to be held in accurate orientation relative to the base 10 with no tilting or canting. As a design objective the vertical displacement of the yoke/yoke-idler flexure-end should be 50 percent of that of the armature/mass (enclosure 18), and, as with enclosure 18, its orientation should remain constant relative to the base 10.

Due to the geometry of the folded flexure system, depending on the flexure length and the stroke length, there will be some inherent horizontal displacement of yoke/yoke-idler flexure-end, toward the opposite attachment end, under deflection; however such displacement is normally small enough to be of no consequence or concern.

The folded flexure assembly 12 as used in the present invention serves a primary function of holding the mass (magnets 22', 22) along with its enclosure 18, oriented parallel to the stroke axis (perpendicular to the mounting base 10) to minimize any tendency to cant, tilt, wobble, etc while being reciprocated. The effectiveness in this role is proportional in a complex geometric manner to the integrity and thickness of the flexure stack or in the case of two tiers, the interspacing.

Requirements for accuracy of stroke-path linearity can range from relatively low with non-voice coil type drivers such as passive reactive devices to extremely high, e.g. in actuators with voice coil structure such as shown in FIGS. 2-4, 7 and 8 where efficient electro-magnetic performance demands that the voice coil reciprocate in a very narrow magnetic air gap and functional performance requires a margin of safety clearance in the air gap against rubbing or scraping under all conditions and over life expectancy. In the case of a single tier, the asymmetric flexure suspension system of this invention could be implemented with the stack(s) containing as few as two flexure strips, assuming sufficiently robust clamping integrity at all flexure end points: the mounting base, the yoke/idler and the mass portion.

For active reciprocation purposes, coil 26 is driven with alternating current at a designated frequency of reciprocation and at a desired amplitude to produce a desired stroke length up to the maximum indicated in FIGS. 3 and 4. The flexure stack is designed to have a predetermined overall value of spring constant, i.e. compliance, such that in conjunction with the amount of mass in the armature/mass, a mechanical resonance occurs at or near the desired frequency of the drive input to coil 26, resulting in high operating efficiency. The designated operating frequency is attained by the length, material and quantity of the flexure strips and the mass of the armature/mass. Design considerations need to include the combination of stresses set up in each flexure strip, particularly at stroke-ends as shown in FIGS. 3 and 4 where each flexure strip is subject to differential compression/tension on opposite sides due to bending near each end, in addition to overall longitudinal compression which in the extreme could introduce a buckling effect. For avoidance of long term fatigue the quantity of flexure trios in each stack should be made with a safety factor over and above the barely adequate.

Figure 5:
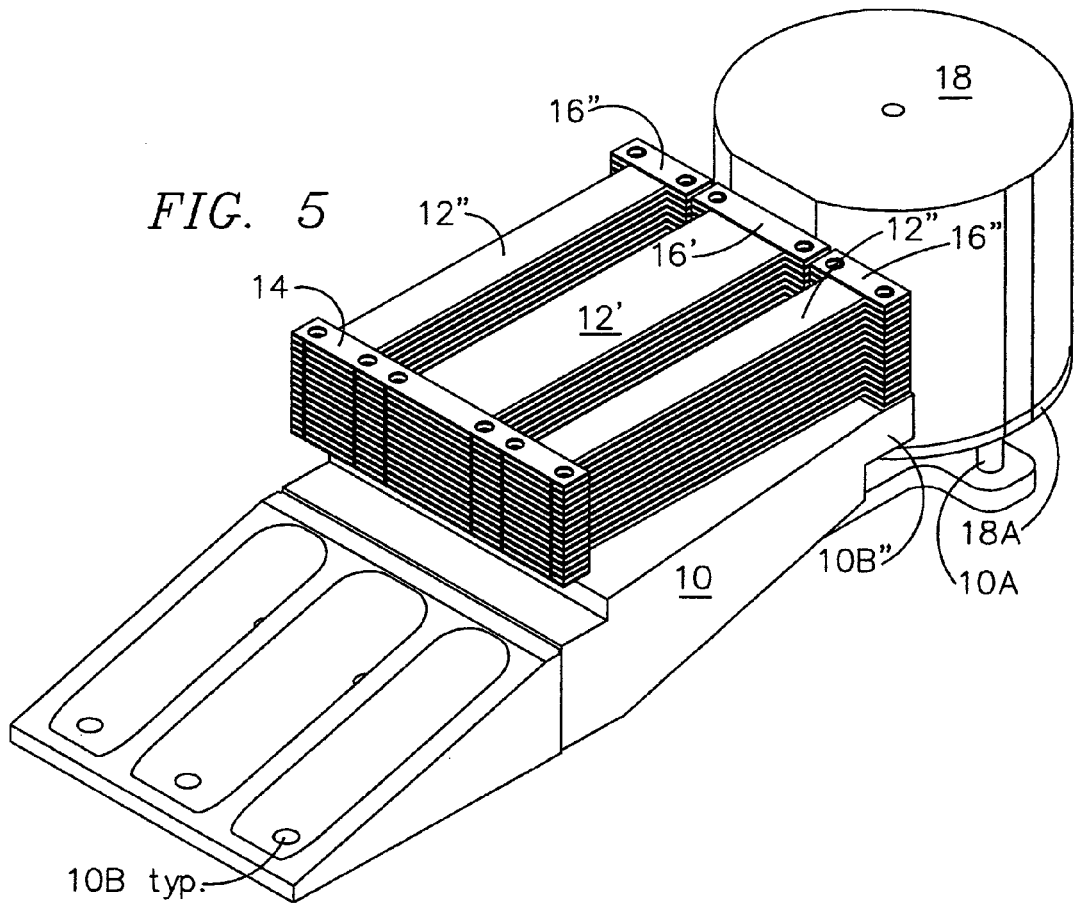
FIG. 5 is a perspective view of the active vibration actuator embodiment of FIG. 2.

FIG. 5 is a perspective view of the vibration actuator of FIGS. 1-2 showing the flexure stack in its quiescent condition, and showing a coil support post 10A, being one of four attached to or formed at a bottom portion of base 10 and traversing clearance openings in enclosure bottom plate 18A. A group of six mounting holes 10B are located in recessed regions at the left hand end.

Figure 6:
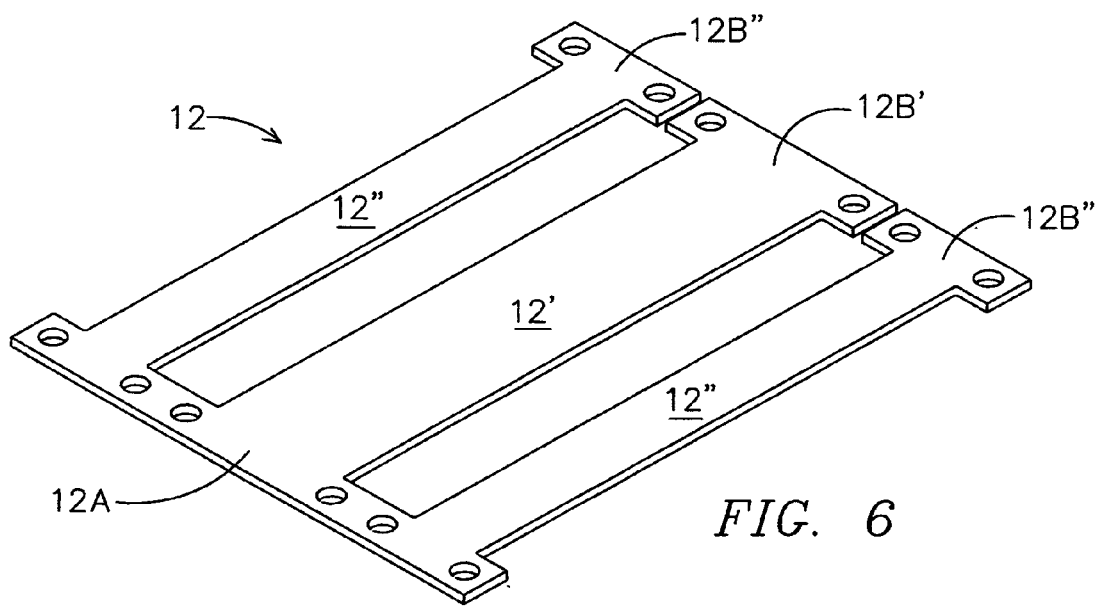
FIG. 6 is an enlarged perspective view of a single flexure element of the actuator of FIGS. 1-5.

FIG. 6 is an enlarged perspective view of a single flexure element 12 of the flexure assembly of the actuator of FIGS. 1-5. The E-shaped trio elements 12 may be stamped out or otherwise fabricated from flat sheet stock of special flexure composition material. Typically in stacking such trio elements 12 they are spaced apart by firm spacer strips placed between the elements at each end. Alternatively the elements 12 may be molded to have thicker end regions to enable stacking without need for additional spacers, and may be shaped with consideration of stress distribution in the element.

The three legs 12", 12' and 12" are preferably attached integrally along the left hand "yoke-idler" end, whereas the three are separated as shown at the right hand end between widened attachment regions 16", 16' and 16". Alternatively the three legs could be made as three (or more) separate pieces with suitable provision for secure mounting and bolt-clamping between keeper bars 14', 14" FIG. 2) extending full-width across the yoke-idler end.

Central leg 12' is made twice the width of each of the side legs 12" and equal in length, as shown, so as to provide a value of spring constant in the combination of the two side legs 12" that is equal to the spring constant of central leg 12', as part of a set of overall design aspects that are essential to ensure that, with the flexure stack properly end-clamped and properly designed otherwise, the armature/mass (enclosure 18) will travel accurately in a straight vertical line and avoidance of canting when driven to reciprocate relative to the base 10.

The ability of these bolt-clamped flexure stacks to withstand the mechanical stresses, moments and buckling forces generated under reciprocation and avoidance of material fatigue are design aspects that need to be addressed in basic design to ensure reliability and to ensure straight-line travel of the enclosure 18 in the asymmetric configuration unique to the present invention.

As a design object, the yoke-idler end and the working ends of the flexure stack along with enclosure 18 itself are to remain oriented in total correspondence with the orientation of the base 10, remaining essentially parallel at all times under deflection with no canting or tilting. As a further design objective the vertical displacement of the yoke-idler region in operation is to be 50% of the displacement of the armature/mass (enclosure 18).

Figure 7:
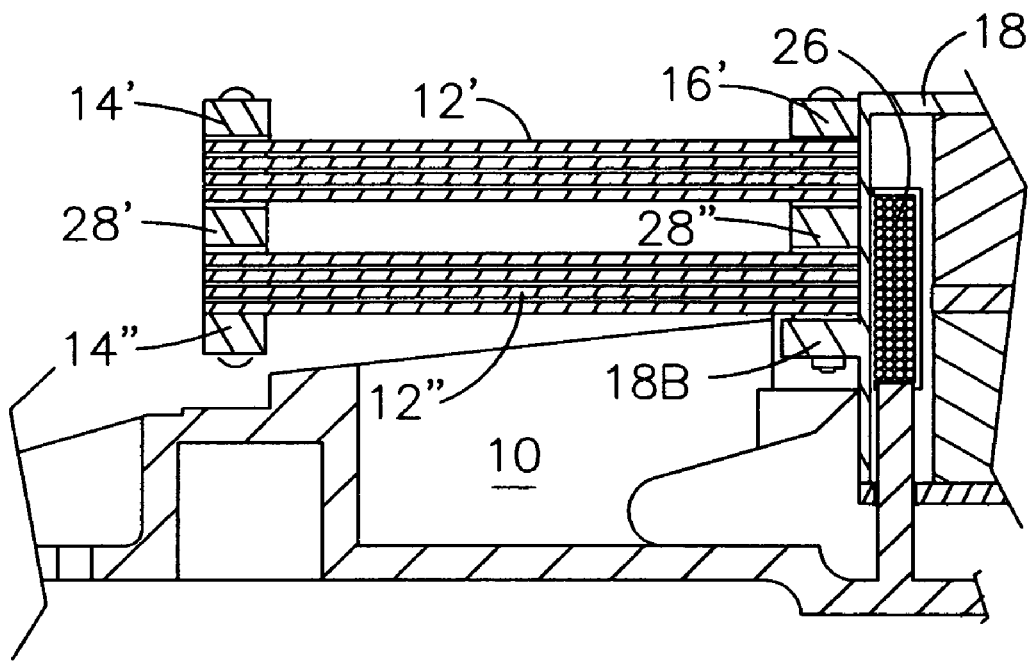
FIG. 7 is a cross-section as in FIG. 2 in an alternative version wherein the flexure stack is divided into two spaced-apart portions.

FIG. 7, a cross-section as in FIG. 2, depicts an alternative version of the actuator wherein the flexure stack is divided into two portions spaced apart by yoke-idler spacer 28' at the left hand end and the center legs 12' and 12" spaced apart by spacer 28" at the right hand end. The side legs, not visible in this view are similarly spaced apart.

Yoke-idler spacer 28" is optional, serving primarily to equalize any random imbalance from variations in either of both of the two portions. It can be implemented as a full width block serving the role of "keeper bars" opposite full width keeper bars 14', 14" interfacing and bolt-clamping the flexure stacks 12', 12".

This alternative can be applied without any modification of base 10 and enclosure 18 as shown and described in connection with FIGS. 1-6. The lower flexure stack is attached to and supported from support 18B which is an integral part of enclosure 18.

In FIGS. 1-7, cantilever stress in support ledge 18B may be reduced by attachment of the central keeper bar 16" to the housing 18, e.g. by a small angle bracket which may be made with elongated mounting holes to accommodate variations in stack thickness.

Figure 8:
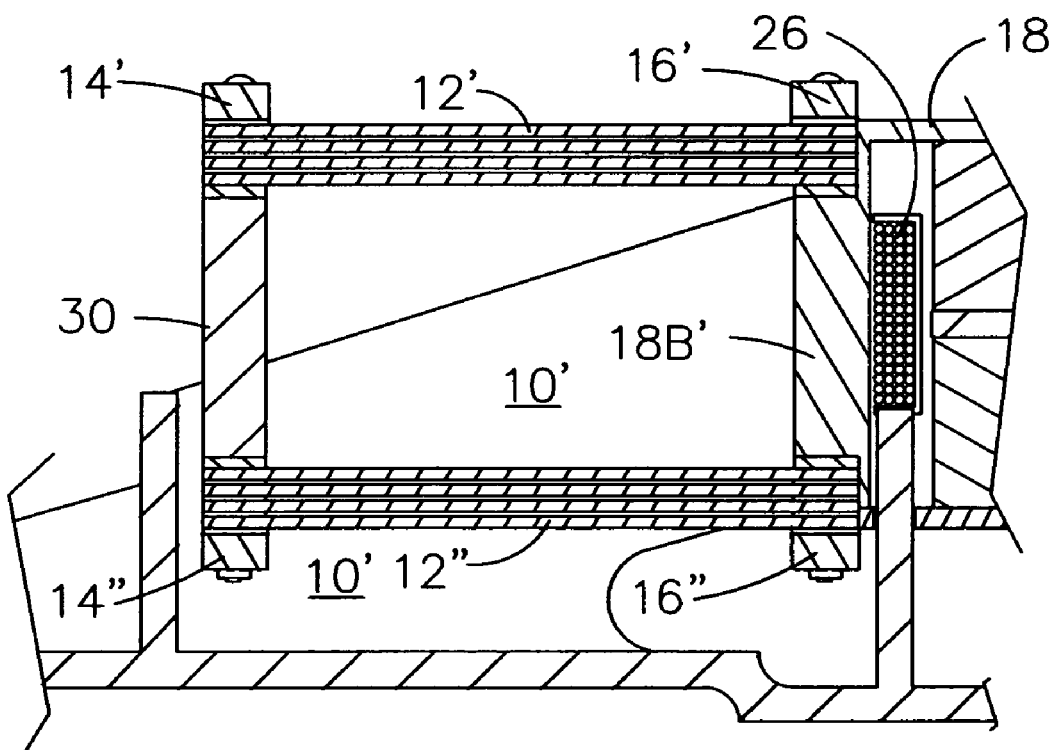
FIG. 8 is a cross-section of an alternative embodiment with the flexure stack divided as in FIG. 7, but more widely spaced and requiring further modifications.

FIG. 8, a cross-section of an alternative embodiment, shows the flexure stack divided into two portions as in FIG. 7, but more widely spaced by a spacer-block 18B', integrally molded as part of enclosure 18, extending over a major centered portion of the height of enclosure 18 as shown. Keeper bars 14', 14" and 16', 16" may be clamped either by long bolts traversing the corresponding spacer 30, 18B', or by shorter bolts engaging threaded holes in the corresponding spacers.

This arrangement provides structural ruggedness and secure attachment between the upper center leg 12' of the flexure strips and the mass enclosure 18 without need for additional fastening in this upper region.

Similarly, for structural ruggedness and secure attachment of the flexure side legs 12" (FIGS. 1,5,6), the base 10' is modified by extending side panels upwardly so as to support integrally molded spacer-blocks, one on each side, equivalent to spacer-block 18C', to provide the spacing between the side-leg working-ends of the flexure assembly and to facilitate bolt-clamping these to base 10'. In this configuration, it would be possible to reduce the number of E-shaped trio elements in each of the two stacks to a smaller number for particular requirements. While in theory, the invention could be practiced with as few as six flexure strips in two flexure trio elements, one above and one below, practical experience and stress analysis indicate need to design conservatively with stacks containing a substantially greater minimum quantity of flexure trios to meet performance and reliability requirements in this field of endeavor.

With single flexure trios or small stacks top and bottom, the two yoke-idlers could be left independent, with a keeper bar on each side of each trio/stack, or they could be tied together with a solid full width spacer block to equalize random imbalance variations.

There are many different yoke-idler configurations with which the invention may be practiced beneficially utilizing combinations of yoke-idler spacing hardware such as full-width spacer strips (thinner than flexure strips), full-width keeper bars (thicker than flexure strips), a full-width spacer block (thicker than keeper bars), or equivalent, typically separated from flexure strips by a keeper bar.

The base configurations shown in the examples above are intended only as examples of particular deployments amongst many different base configurations with which the invention may be practiced beneficially.

The principles of the invention could be practiced with other than two magnets and/or with more than one coil, however such implementations would result in unacceptable increases in size, cost and/or complexity.

As an alternative to the arrangement described, the invention could be practiced with the center leg of the E-shaped trio(s) attached to a central region of the base and the side legs attached to the enclosure.

Descriptions and drawings herein relating to the base portion and flexure system of an actuator for active vibration control with the driver system incorporated in an armature/mass portion, apply also to the flexure system of a corresponding reactive device for passive vibration control, with the exception that, in a reactive device for passive vibration control, the mass portion is configured as a simple solid mass of any designated shape, with no magnetically-related requirements The basic principles of asymmetric flexure suspension in accordance with the present invention can be practiced in conjunction with various driver approaches and aspects of flexure stack structure applicable to many different types of reciprocating device approaches including folded flexure embodiments disclosed by the present inventor in the referenced U.S. Pat. No. 7,550,880.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A suspension flexure assembly constituting an essential component of a reciprocative linear device including a mounting base made and arranged for operational attachment to an external host object; the device including a mass portion, forming a mass mechanical node of the device, and being required to reciprocate along a stroke axis defining a linear travel path, comprising:

a flexure suspension assembly constituting a compliant link coupling the mounting base to the mass portion for purposes of vibration control deployment, said flexure suspension assembly comprising an assembly of flexure strips connected between the mounting base and the mass portion, said flexure suspension assembly being located offset radially and located within a single quadrant from the stroke axis and thus asymmetric relative to the mass portion, said suspension assembly being made and arranged to enable reciprocating travel of the mass portion restricted to a linear path collinear with the stroke axis, and to a travel range of predetermined stroke length while holding the mass portion oriented collinear with the stroke axis, and to apply a restoring force with a designated spring constant acting bidirectionally about a neutral location of the mass portion, centered within the travel range, at which the mass portion is made to rest in absence of applied driving force.

2. The suspension flexure assembly as defined in claim 1, deployed as an essential component of a passive vibration control device for reducing unwanted vibration of the host object and thusly deployed with no source of reciprocative driving force applied to the mass portion apart from reciprocative forces induced via the mounting base from the unwanted vibration of the external host object;

the reciprocative linear device including said suspension flexure assembly being made and arranged in a manner to translate any reciprocative travel of the mass portion relative to the mounting base into a reaction on the host object that reduces the unwanted vibration.

3. The suspension flexure assembly as defined in claim 1 wherein said flexure portion comprises:

at least a first and second trio of generally flat elongate flexure strips of equal designated length, same thickness and of same designated spring material, each trio having as a center flexure strip of designated width flanked in a side-by-side array by a pair of side flexure strips having a width equal to one half the designated width of the center flexure strip;

yoke-idler stiffening means associated with each trio of generally flat flexure strips, made and arranged to fasten a first end, known as "the yoke-idler end", of each of the three flexure strips together in a manner to hold all three yoke-idler ends of the flat flexure strips rigidly in a common yoke-idler-trio plane, nominally perpendicular to the with no twisting or other distortion, thus forming, from each trio, an E-shaped folded-flexure element having an extending center leg end constituting a first working attachment means and two extending side leg ends in combination constituting a second working attachment means, with opposite legs ends of the flexure strips secured together by said stiffening means as a solid unit constituting a yoke-idler mechanical node;

said trios being located with the legs thereof parallel with the base plane and oriented in a common direction with the leg-end working members facing the mass portion;

the first trio being located closer to the base plane than the second trio, the two trios being separated from each other by a predetermined distance;

one of the two working attachment means of each trio being secured to the mass portion via rigid attachment thereto; and the other of the two working attachment means of each trio being secured to the mounting base by rigid attachment thereto;

whereby said mass portion is held oriented parallel to the stroke axis when actuated to reciprocate relative to the mounting base.

4. The suspension flexure assembly as defined in claim 3 wherein:

the first working attachment means at the center leg of each trio is attached to the mass mechanical node at a designated location of the mass portion; and the second working attachment means at the side legs of each trio is attached to the base mechanical node at two opposite sides of the base portion, each side leg being attached to a corresponding side thereof.

5. The suspension flexure assembly as defined in claim 3 wherein:
   the first working attachment means at the center leg of each trio is attached to the base mechanical node at a designated location of the base portion; and
   the second working attachment means at the side legs of each trio are attached to the mass mechanical node at two corresponding locations on the mass portion.

6. The suspension flexure assembly as defined in claim 3 wherein said yoke-idler fastening means for said first and second trio of generally flat elongate flexure strips each comprises:
   a solid yoke-idler bar extending laterally across the yoke-idler end region of each of the trio of strips and rigidly fastened thereto.

7. The suspension flexure assembly as defined in claim 6 further comprising:
   said yoke-idler bar associated with the first trio being located on a side of the trio facing toward the mounting base;
   said yoke-idler bar associated with the second trio being located on a side of the trio facing away from the mounting base; and
   spacer means interfacing the yoke-idler ends of the two trios on sides thereof opposite the respective spacer bars; and
   a plurality of fasteners traversing openings provided in the spacer bars and the spacer means, tightened to clamp all yoke-idler items firmly together in implementation of the stiffening means of the yoke/idler node.

8. The suspension flexure assembly as defined in claim 7 wherein said spacer means comprises:
   a solid block extending full width of the trios and full distance between the two trios.

9. The suspension flexure assembly as defined in claim 7 wherein said spacer means comprises;
   a plurality of additional trios stacked together, separated at each interfacing end region by a spacer washer of designated thickness, in sufficient quantity of trios to fill the distance between the first and second trio, each trio being in effect connected to the mass portion and to the mounting base portion in the same manner as the first and second trio.

10. The suspension flexure assembly as defined in claim 9 further comprising a plurality of yoke-idler spacers of designated thickness disposed between interfacing flexure surfaces of the trios at the yoke-idler ends of the flexure strips, for the purpose of preventing surface contact between interfacing flexure strips in major central regions.

11. The suspension flexure assembly as defined in claim 7 wherein said spacer means comprises:
   a plurality of additional trios stacked together in sufficient quantity to fill the distance between the first and second trio, each connected to the mass portion and to the mounting base in the same manner as the first and second trio; and
   each of the flexure strips being configured with both end regions thicker than a major central region thereof to prevent surface contact between interfacing flexure strips in the major central regions thus potentially eliminating need for yoke-idler spacers.

12. A reciprocative linear actuator for active vibration control of an external host object, comprising:
   a base portion, forming a base mechanical node of said linear actuator, including a mounting base, made and arranged for operational attachment to the host object being subjected to vibration control from deployment of said actuator;
   a mass portion, forming a mass mechanical node of said linear actuator, located in a region offset from the base portion;
   a hollow enclosure, made from magnetically-permeable metal, containing an electromagnetic driver system implemented with two permanent magnets attached to said enclosure as part of an armature/mass node, and containing a coil wound on a bobbin which is attached to the base portion by coil support means, as part of a stator/base node, the coil being traversed by magnetic flux from the magnets so as to operate in a voice coil mode to drive the armature/mass portion relative to the stator/base portion; and
   a flexure portion, including at least one compliant link coupling said base portion to said mass portion for purposes of active vibration control deployment, said flexure portion comprising at least one assembly of flexure strips, connected between the base portion and the mass portion, made and arranged to restrict reciprocating travel of the mass portion to a linear path, and to a travel range of predetermined stroke length along a designated stroke axis stroke axis while holding said mass portion and said hollow enclosure uniformly oriented relative to the stroke axis, and to apply a restoring force with a designated spring constant acting bidirectionally about a neutral location of said mass portion, centered within the travel range, at which the mass portion is made to rest in absence of applied driving force, said flexure portion being disposed asymmetrically relative to the mass portion, extending therefrom and contained within a semi-circular region about the stroke axis.

13. The reciprocative linear actuator for active vibration control as defined in claim 12 wherein said hollow enclosure further comprises:
   first and second circular magnetically-permeable flat end panels perpendicular to the stroke axis and enclosing respective opposite ends of said enclosure; the first end panel being located proximal to the base portion;
   a circular pole piece made from magnetically-permeable metal, disposed centrally within said enclosure, made and arranged to form a magnetic pole at a circumferential region of said pole piece spaced from said enclosure by a uniform annular air gap;
   a first permanent magnet disposed within the enclosure having a first magnetic pole in magnetic contact with said circular flat pole-piece and a second magnetic pole in magnetic contact with a first one of the end panels
   a second permanent magnet disposed within the enclosure having a first magnetic pole in magnetic contact with said circular flat pole-piece and a second magnetic pole in magnetic contact with a second one of the end panels;
   said first and second permanent magnets being polarized in a like manner so as to charge the annular air gap with magnetic flux density that is a sum of magnetic flux contribution from each of said two magnets.

14. The electro-magnetic linear actuator as defined in claim 13 wherein;
   said first and second permanent magnets are made identical so as to each contribute equally to the magnetic flux density in the air gap; and
   whereby two symmetrical additive magnetic paths thusly formed within said magnetically-permeable enclosure are made to combine in a single magnetically-charged gap in a unique armature/mass and driver configuration that enables said actuator to meet designated performance requirements in a more compact size than can be attained in any voice coil type actuator having a quantity of magnets other than two and/or having more than one coil.

15. The reciprocative linear actuator for active vibration control as defined in claim 12 wherein said coil support means comprises the coil of copper magnet wire wound on an insulating bobbin formed as a sleeve and mounted on a plurality of support posts extending perpendicularly from the base, traversing a set of clearance openings configured in one of the circular flat pole-piece panels and engaging the bobbin, the bobbin being located symmetrically about the magnetically-charged air gap such that the enclosure can be deflected linearly in first and second opposite directions collinear with the central axis by electric current applied to the coil in first and second opposite polarity, with deflection displacement proportional to the current.

16. The reciprocative linear actuator for active vibration control as defined in claim 12 wherein said coil support system comprises a set of coil support posts extending from the base to a proximal end of the bobbin, traversing respective openings configured in the first end plate of said enclosure, the openings being dimensioned and located so as to provide substantial working clearance from the coil support posts.

* * * * *